Feb. 6, 1923.
E. H. HANEY.
SELF LOADING TRUCK.
FILED OCT. 31, 1921.
1,444,604.
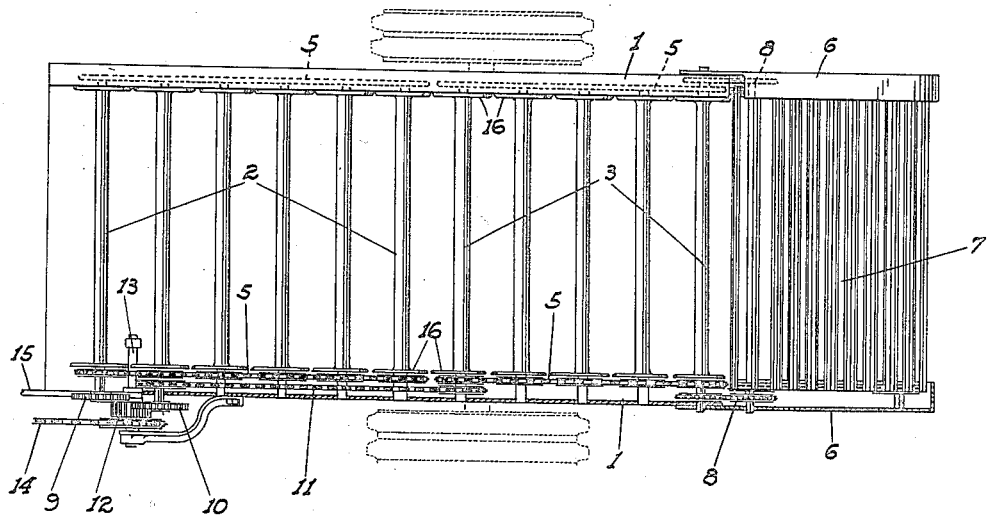
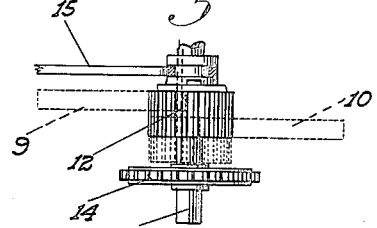
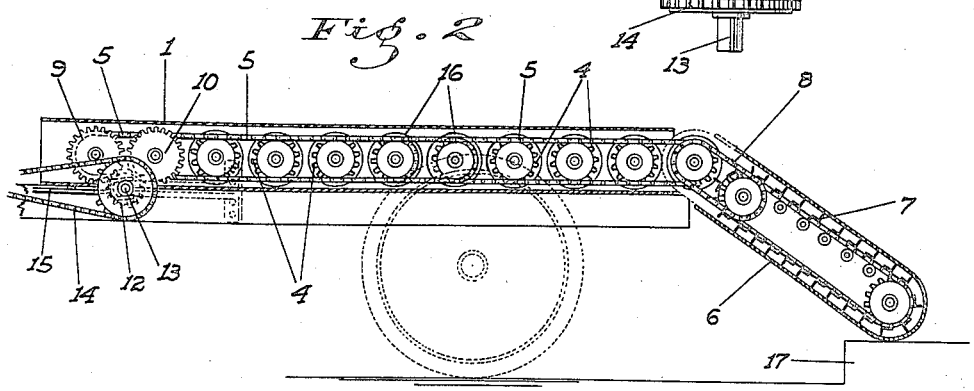
INVENTOR.
Edwin H. Haney
BY
ATTORNEY Patented Feb. 6, 1923.

1,444,604

UNITED STATES PATENT OFFICE.

EDWIN H. HANEY, OF LOS ANGELES, CALIFORNIA.

SELF-LOADING TRUCK.

Application filed October 31, 1921. Serial No. 511,747.

*To all whom it may concern:*

Be it known that I, EDWIN H. HANEY, a citizen of the United States, residing at Los Angeles, county of Los Angeles, State of California, have invented certain new and useful Improvements in Self - Loading Trucks; and I do declare the following to be a full, clear, and exact description of the same, reference being had to the accompanying drawings, and to the characters of reference marked thereon, which form a part of this application.

This invention relates to improvements in transfer trucks, preferably of the motor driven type, and particularly to that style used to transport large and heavy pieces of merchandise, which are ordinarily very difficult to load onto and remove from the truck.

The principal object of my invention is to provide a truck of this kind with a power driven means whereby the merchandise to be transported may be easily and quickly loaded onto or removed from the truck, without the necessity of any physical effort on the part of the truckmen being had other than to guide the packing cases or other articles during their movement, and to place them in position to be acted on by the power means, or removed from adjacent the same after the cases are unloaded.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a side outline of a portion of a motor truck showing my improved power loading and unloading means.

Fig. 2 is a side elevation of the same, the adjacent face of the frame being removed.

Fig. 3 is an enlarged fragmentary plan view of the driven conveyor control mechanism.

Referring now more particularly to the drawings, the characters of reference on the drawings, the numeral 1 denotes a pair of longitudinal frame members, transversely spaced, preferably channel shaped in cross section, mounted on the chassis of a truck in any suitable manner, or the truck may be built to utilize such members in place of a frame of its own.

Journaled in these frames and extending therebetween is a plurality of front and rear sets of rollers 2 and 3 or similar members, of a strength sufficient to support any load the truck may be called on to carry, all the rollers being spaced equal distances apart, and serving in place of the usual floor.

Each set is provided on both ends with sprocket wheels 4, over all of which in a set pass endless chains 5 or similar driving members, these sprockets and chains being concealed within the channels.

Turnably mounted on the rearmost one of the rollers 3, which is at the extreme rear end of the frame and truck, is an auxiliary apron-frame structure 6, provided with an endless conveyor 7, which is driven in conjunction with the rollers 3 by means of an auxiliary chain or similar drive 8 from said rollers 3.

One of the rollers 2 has a gear 9 fixed thereon outside the sprocket 4 thereof, whereas another similar gear 10 is positioned adjacent the same but in somewhat of a transversely offset plane relative thereto, this latter gear being operatively connected with one of the rollers 3 by means of a chain or other drive 11.

Adapted to mesh with both gears at a time or with only that one connected with the rollers 3 is a wide faced pinion 12, splined on a stub jackshaft 13 driven from the engine of the truck by means of a chain or other drive 14, there being preferably a change speed transmission mechanism interposed between the engine and said drive, whereby to alter the speed of the shaft 13, and hence that of the rollers 2 and 3 and apron conveyor, at will.

The pinion 12 may be shifted from one position to the other by any suitable means, as for instance a hand controlled lever 15.

The rollers 2 and 3 preferably have wide flanges 16 at their ends adjacent the frames 1, and positioned to protect the sprockets and chains, so as to prevent the packing cases, etc., from coming in contact with said chains, to the possible damage of both.

In operation, to load the truck, the same is preferably backed into a suitable position as usual, and the apron 6 then lowered to rest on the sidewalk or platform 17. The shaft 13 is then set in motion, with the pinion 12 in mesh with both gears 9 and 10, thus causing the endless conveyor 7 to move, and the rollers 2 and 3 to be rotated.

Any merchandise then lifted and moved just sufficient to rest and be acted on by the conveyor 7 will be drawn up thereby to rest on the rollers and to be then further moved up to the front of the truck. As soon as the forward half of the movable roller-bed is filled, power may be withdrawn from the rollers 2 by shifting the pinion 13, the rollers 3 and conveyor 7 continuing to operate until the entire truck is loaded. The apron may then be swung up out of the way, turning on its pivotal roller 3 as an axis. In unloading, the reverse operations are carried out.

I have shown plain rollers, on which the load is moved and supported, but any other shape of rollers, or form of endless driven supporting and conveying means, may of course be used, such as may be found desirable.

Also, while I have shown two roller-sets, more may be used if the length of the truck renders this desirable.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. A self loading truck structure comprising frame members fixed on the truck lengthwise thereof, a plurality of rollers journaled in the frames and extending transversely therebetween and serving as the floor of the truck, said rollers being divided into sets successively arranged and each set being connected to rotate in unison, gears operatively connected to a roller of each set and positioned adjacent each other and a driven pinion adapted to mesh with all the gears at a time and to be moved to be disengaged from certain of said gears at will.

2. A self loading truck structure comprising frame members fixed on the truck lengthwise thereof, a plurality of rollers journaled in the frames and extending transversely therebetween and serving as the floor of the truck, said rollers being divided into front and rear sets, those in each set being operatively connected to be rotated in unison, an apron-conveyor at the rear end of the truck connected to be driven with the rotation of the rollers of the adjacent set, and means for driving both sets of rollers in common while allowing the front set to be disengaged at will.

3. A self loading truck structure comprising frame members fixed on the truck lengthwise thereof, a plurality of rollers journaled in the frames and extending transversely therebetween and serving as the floor of the truck, said rollers being divided into front and rear sets, those in each set being operatively connected to be rotated in unison and a common drive member arranged to drive both sets and to be disengaged from the front set at will.

In testimony whereof I affix my signature.

EDWIN H. HANEY.